(12) United States Patent
Liu et al.

(10) Patent No.: US 8,580,891 B2
(45) Date of Patent: Nov. 12, 2013

(54) SILICONE ACRYLIC HYBRID POLYMER-BASED ADHESIVES

(75) Inventors: Yuxia Liu, Dayton, NJ (US); Charles Willard Paul, Madison, NJ (US); Jiangbo Ouyang, Flemington, NJ (US); Paul B. Foreman, Somerville, NJ (US); Laxmisha M. Sridhar, Monmouth Junction, NJ (US); Smita Shah, Edison, NJ (US)

(73) Assignee: Henkel US IP LLC, Rocky Hill, CT (US)

( * ) Notice: Subject to any disclaimer, the term of this patent is extended or adjusted under 35 U.S.C. 154(b) by 52 days.

(21) Appl. No.: 13/279,721

(22) Filed: Oct. 24, 2011

(65) Prior Publication Data

US 2012/0095159 A1 Apr. 19, 2012

Related U.S. Application Data

(63) Continuation of application No. PCT/US2010/032206, filed on Apr. 23, 2010.

(60) Provisional application No. 61/172,469, filed on Apr. 24, 2009.

(51) Int. Cl.
*C08F 283/12* (2006.01)

(52) U.S. Cl.
USPC .......................................................... 525/100

(58) Field of Classification Search
USPC .......................................................... 525/100
See application file for complete search history.

(56) References Cited

U.S. PATENT DOCUMENTS

| | | | |
|---|---|---|---|
| 2,676,182 A | | 4/1954 | Daudt at al. |
| 2,814,601 A | | 11/1957 | Currie et al. |
| 4,618,644 A | * | 10/1986 | Liu .............................. 524/535 |
| 4,655,767 A | | 4/1987 | Woodard et al. |
| 4,898,920 A | | 2/1990 | Lee et al. |
| 5,063,254 A | * | 11/1991 | Nakos .............................. 522/43 |
| 5,308,887 A | * | 5/1994 | Ko et al. ........................ 522/148 |
| 5,464,659 A | * | 11/1995 | Melancon et al. ............ 427/387 |
| 5,474,783 A | | 12/1995 | Miranda et al. |
| 5,482,988 A | | 1/1996 | Ulman et al. |
| 5,516,865 A | * | 5/1996 | Urquiola .................... 526/329.7 |
| 5,561,203 A | | 10/1996 | Strong et al. |
| RE35,474 E | | 3/1997 | Woodard et al. |
| 5,656,286 A | | 8/1997 | Miranda et al. |
| 5,939,477 A | | 8/1999 | Pretzer et al. |
| 5,958,446 A | | 9/1999 | Miranda et al. |
| 6,024,976 A | | 2/2000 | Miranda et al. |
| 6,100,332 A | * | 8/2000 | Yoshikawa et al. ........... 525/101 |
| 6,221,383 B1 | | 4/2001 | Miranda et al. |
| 6,235,306 B1 | | 5/2001 | Miranda et al. |
| 6,465,004 B1 | | 10/2002 | Rossi-Montero et al. |
| 6,638,528 B1 | | 10/2003 | Kanios |
| 7,886,499 B2 | * | 2/2011 | Okuda et al. .................... 52/750 |
| 2004/0020597 A1 | | 2/2004 | Hashiguchi et al. |
| 2008/0051497 A1 | | 2/2008 | Lu et al. |
| 2008/0057251 A1 | | 3/2008 | Griswold et al. |
| 2008/0280086 A1 | | 11/2008 | Sheridan et al. |
| 2008/0295960 A1 | | 12/2008 | Schalau, II et al. |

FOREIGN PATENT DOCUMENTS

| | | | |
|---|---|---|---|
| EP | 0632060 A2 | | 1/1995 |
| EP | 0667382 A1 | | 8/1995 |
| WO | 2007050580 A2 | | 5/2007 |
| WO | 2007/145996 | * | 12/2007 |
| WO | 2007145996 A2 | | 12/2007 |

OTHER PUBLICATIONS

Smith, E.W. et al. (editors), "Percutaneous Penetration Enhancers", CRC Press, 1995.
Brook, Michael A., "Silicon in Organic, Organometallic, and Polymer Chemistry," John Wiley & Sons, 2000.

* cited by examiner

*Primary Examiner* — Margaret Moore
(74) *Attorney, Agent, or Firm* — Sun Hee Lehmann

(57) ABSTRACT

Silicone acrylic hybrid compositions prepared by reacting together silicone polymers, silicone resins, and silyl containing acrylic polymers are useful in adhesive compositions that find use in skin contact applications.

18 Claims, 2 Drawing Sheets

SILICONE ACRYLIC HYBRID POLYMER-BASED ADHESIVES

CROSS-REFERENCE TO RELATED APPLICATIONS

This application is a continuation of International Patent Application No. PCT/US2010/032206 filed Apr. 23, 2010, which claims the benefit of U.S. Provisional Patent Application No. 61/172,469 filed on Apr. 24, 2009, the contents of both of which are incorporated herein by reference.

FIELD OF THE INVENTION

The invention relates to silicone acrylic hybrid polymers, pressure sensitive adhesive compositions comprising the hybrid polymers and end use applications thereof. In particular, the invention relates to adhesives that are ideally suited for skin contact applications and can be used in the manufacture of medical tapes and transdermal drug delivery systems.

BACKGROUND OF THE INVENTION

Pressure-sensitive adhesive (PSA) compositions are used in the manufacture of pressure-sensitive adhesive tapes. Such tapes generally comprise a backing substrate and a PSA composition.

One field where PSA compositions find wide spread use is the medical segment, e.g., various tapes, bandages and drug delivery devices. In many such applications, such as for example skin plasters, there is direct contact between the PSA composition and the patient's skin. Adhesives for application to the skin are permanently tacky at room temperature, hold the adhered article to the skin with gentle pressure, and should be easily removed without causing pain or depositing adhesive residue.

In medical applications, the requirements imposed on the PSA composition are especially stringent, since it is necessary to avoid skin irritation and allergic reaction. Moreover, such adhesives need to adhere well to human skin during perspiration, when the weather is hot, or in an environment of draining wounds.

The continuous controlled delivery of drugs through the derma, i.e., skin, provides many advantages over other routes of administration. Transdermal drug delivery is a comfortable, convenient, and noninvasive alternative to other means of drug delivery such as by ingesting medication at fixed time intervals orally or by way of subcutaneous injection. Transdermal drug delivery systems not only allow the controlled release of a pharmaceutical product in a sustained release fashion, but reduce side effects such as gastrointestinal irritation, avoid hepatic first-pass inactivation, poor or erratic absorption from the gastrointestinal tract, and inactivation by the gastrointestinal fluids. Transdermal drug delivery also makes possible a high degree of control over blood concentrations of any particular drug. These advantages enhance patient compliance and improve the safety and efficacy of medications.

In transdermal drug delivery systems, drugs are delivered from a patch applied to the skin with a pressure sensitive adhesive. The known advantages of continuous transdermal drug delivery devices has prompted the development of transdermal drug delivery systems for the administration of a variety of drugs.

Acrylate-based PSAs have been broadly used in transdermal drug delivery systems since they are relatively low in cost compared to other PSAs, solubilize many kinds of functional drugs, adhere well to a variety of different surfaces and, if necessary, can be formulated to build adhesion to a surface. The disadvantages of acrylate-based PSAs include poor high temperature performance, poor low temperature performance, inability to adhere to surfaces with low surface energies and the potential to build excessive adhesion to the skin in medical tape applications which can result in painful removal for the user.

Silicone-based adhesives exhibit both good high and low temperature performance, have excellent chemical inertness, electrical insulating properties, biocompatibility, and the ability to adhere to low surface energy substrates. A primary disadvantage of silicone-based PSAs is their high cost compared to other technologies. Other limitations include lower tack and limited adhesion build, when necessary, in comparison to acrylate-based PSAs.

While both silicone adhesives and acrylic adhesives for application to the skin are known and used in the art, there is an ongoing demand and continuing need for improved PSAs that can be used in medical applications, in particular for drug delivery applications. In transdermal drug delivery applications the pharmaceutically active ingredient normally has very low solubility in a silicone PSA matrix whereas the solubility in an acrylic PSA matrix is normally higher. It is sometimes desirable to achieve an intermediate level of solubility in order to optimize the delivery system for a specific application. A simple approach adopted by Noven Pharmaceuticals, Inc. in U.S. Pat. Nos. 5,474,783, 5,656,286, 6,024,976, 6,221,383, 6,235,306, 6,465,004 and 6,638,528 is to prepare a simple blend of silicone and acrylic PSAs. While optimization of drug solubility can be achieved via this approach, such a blend of incompatible polymers is thermodynamically unstable. This can lead to macroscopic phase separation and changes in adhesive properties with time. An attempt to overcome this problem by creating an acrylic grafted silicone PSA was made by Dow Corning Corp. as disclosed in International Publication No. WO 2007/145996 which uses a three step process where the silicone PSA is first prepared by bodying the gum and resin, then this PSA is capped with a free-radically reactive reagent, and finally acrylic monomer is added and then free-radically polymerized in the presence of the capped-PSA. This complex process makes removal of residual monomer more problematic. High levels of acrylic monomer are unacceptable in skin contact applications. In addition, while free-radical grafting of the silicone and acrylic polymers can take place it is relatively uncontrolled. A further disadvantage of this approach is that an external crosslinker and/or high levels of acid comonomer are required in order to achieve high cohesive strength. High cohesion may be necessary in order to overcome the plasticizing effects of certain active ingredients or other excipients such as skin permeation enhancers leading to adhesive cold flow around the edge of the patch and adhesive residue on the skin following removal of the patch. External crosslinkers such as dibenzoyl peroxide, metal acetyl acetonates or orthoalkyl titanates can result in undesirable byproduct formation resulting from their decomposition or from interaction with the drug. High levels of acid also are undesirable due to the potential for interacting with the drug.

A physical blend of silicone and acrylate are known, however such physical blend is thermodynamically unstable and would lead to macroscopic phase separation and changes in the adhesive properties over time. Also, unreacted silicone and acrylic components are not miscible this can also lead to phase separation over time, even if the rest of components are covalently grafted together.

The present invention describes a method for creating novel covalently grafted blends of silicone and acrylic by using pre-polymerized acrylic polymer, but containing reactive groups and combining it with the precursor to a silicone PSA. These reactive groups on the acrylic are preferably grafted to the silicone PSA during its final reaction phase, known as the "bodying" step, whereby reactive groups on the silicone gum and resin are condensed to form covalent bonds. The acrylic's reactive groups are such as to be able to participate in this bodying process while simultaneously self-crosslinking. Thus the acrylic is grafted to the final silicone PSA in a single step via a more controlled reaction; no acrylic monomer need be removed, and high levels of shear can be obtained without external crosslinking agents or high levels of acid comonomer.

The current invention addresses the need in the art for PSAs that exhibit the advantages of both acrylate- and silicone-based adhesive technologies without the disadvantages inherent in the prior art.

SUMMARY OF THE INVENTION

The invention provides polymers and adhesive compositions that can be directly used or formulated for use in medical applications, including use in transdermal drug delivery systems.

One aspect of the invention is directed to hybrid silicone polymers. The hybrid polymers of the invention are prepared by reacting a silicone polymer component, a silicone resin component and an acrylic polymer component. In one embodiment, the hybrid polymer is prepared by chemically reacting together a silicone polymer component, a silicone resin component and an acrylic polymer component to form a hybrid silicone acrylate polymer wherein the acrylic polymer component is covalently self-crosslinked and is covalently bound to the silicone polymer and/or silicone resin components. In a second embodiment of the invention the hybrid polymer is prepared by chemically reacting together a silicone polymer component, a silicone resin component and an acrylic polymer component to form a hybrid silicone acrylate polymer wherein the silicone resin component comprises a silicone resin containing triorganosiloxy units $R_3SiO_{1/2}$, where R is an organic group, and tetrafunctional siloxyl units $SiO_{4/2}$ in a mole ratio of from 0.1 to 0.9 $R_3SiO_{1/2}$ units for each $SiO_{4/2}$. In one preferred embodiment, the acrylic polymer comprises greater than about 90 wt % of an alkyl(meth)acrylate component and greater than about 0.2 wt % of alkoxysilyl functional monomers, halosilane containing monomers, and/or polysiloxane-containing monomers. In a second embodiment, the acrylic polymer comprises end-capped alkoxysilyl functional groups and/or polysiloxane-end blocked macromer.

Another aspect of the invention is directed to a method of forming a hybrid polymer by means of sequential condensation reaction. A silicone polymer component is first reacted with a silicone resin component to form a resultant silicone PSA, and this resultant silicone PSA is then reacted with an acrylic polymer containing reactive functionality to form a hybrid silicone acrylic polymer.

In another aspect, silicone resin component first is reacted with an acrylic polymer containing reactive functionality to form an intermediate, and a silicone polymer component is then reacted with this intermediate to form a hybrid silicone acrylic polymer.

In a further aspect, silicone polymer component is first reacted with an acrylic polymer containing reactive functionality to form an intermediate, and a silicone resin component is then reacted with this intermediate to form a hybrid silicone acrylic polymer.

In the above reactions, the components are reacted in an organic solvent in the presence of an acid, base, or organometallic catalyst such as an organic salt of tin, titanium, aluminum, bismuth, organometallic reagents such as organolitium reagents and Grignard reagents, or mixtures thereof.

Another aspect of the invention is directed to pressure sensitive adhesives and pressure sensitive adhesive articles prepared using the hybrid polymers of the invention. The adhesives may advantageously be used to prepare pressure sensitive adhesive articles for use in medical applications or industrial applications. The adhesive may be used in the manufacture of articles such as plasters, bandages and tapes which are adhesively adhered to the skin. The articles of the invention will typically comprise a backing substrate having coated to at least one surface thereof an adhesive. In one embodiment the article comprise a pressure sensitive adhesive and a therapeutic agent. In a preferred embodiment, the adhesive serves as a carrier for the physiologically active agent. The adhesive will typically comprise hybrid polymers containing greater than 20% of a silicone polymer component, greater than 20% of a silicone resin component, and less than 60% of an acrylic polymer component.

Still another aspect of the invention is directed to a method of administering a therapeutic agent to a patient comprising applying to a body surface of the patient an article comprising a backing substrate having coated to at least one surface thereof a pressure sensitive adhesive and a physiologically active agent. In one embodiment the article includes an adhesive layer into which the drug to be delivered is incorporated, a distal backing layer and a proximal release layer.

BRIEF DESCRIPTION OF THE DRAWING FIGURES

DETAILED DESCRIPTION OF THE INVENTION

Figure 1:
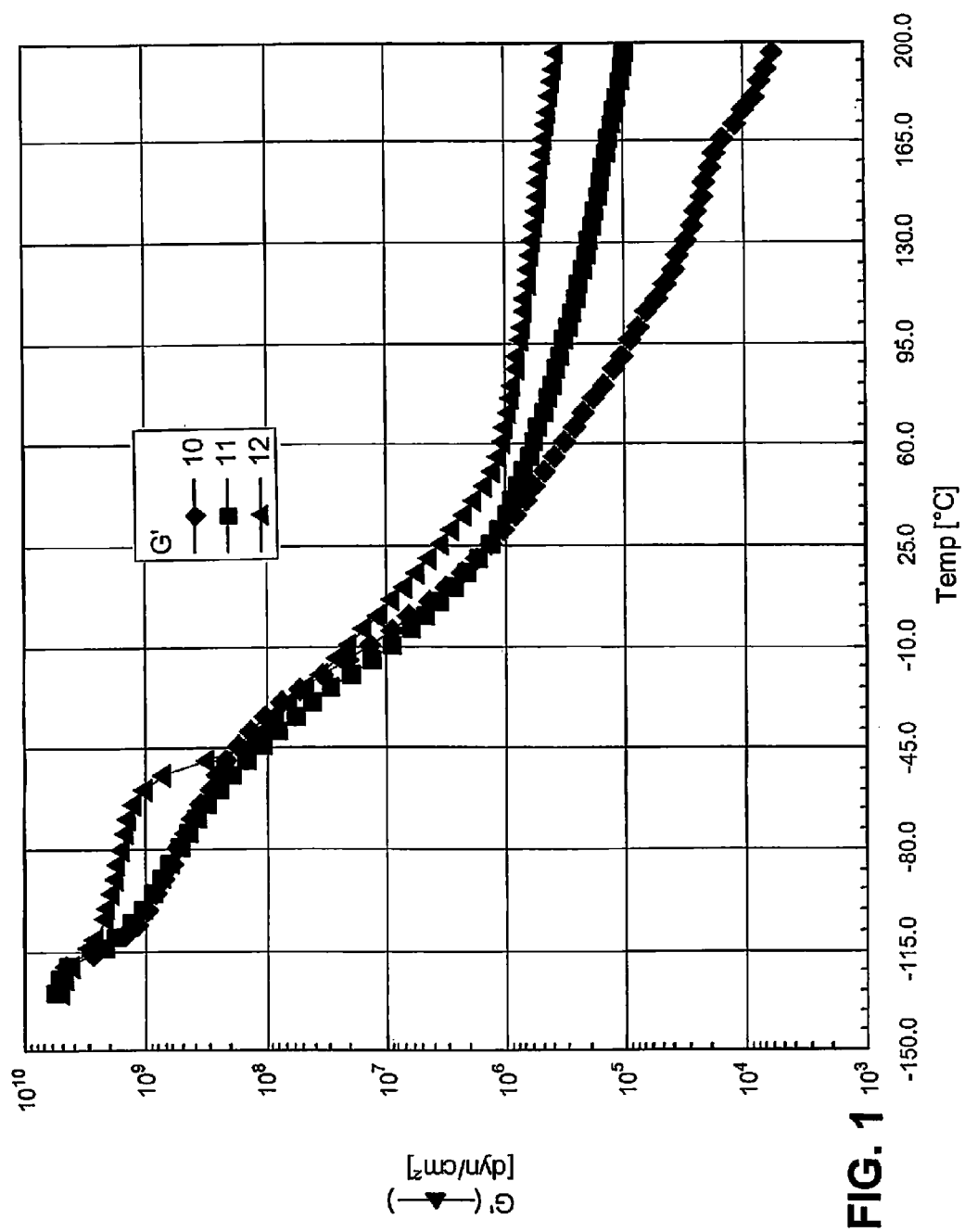
FIG. 1 is a DMA graph comparing the mechanical behavior of a prior art silicone acrylic blend (-◇-) and the silicone acrylate hybrid of the invention (-□-) and (-△-).

Percent by weight means, unless expressly stated otherwise, percent dry weight.

The invention provides hybrid polymers prepared by reacting a mixture of a silicone polymer component, a silicone resin component, and an acrylic polymer component. The invention also provides pressure sensitive adhesives comprising the hybrid polymers. The adhesives of the invention exhibit properties that make them will suited to industrial, as well as drug delivery and cosmetic and delicate skin contact applications.

The components used to prepare the hybrid polymer are reacted in an organic solvent in the presence of a catalyst such as a base, an acid, and/or an organometallic catalyst such as an organic salt of tin, titanium, aluminum, bismuth, organolithium, Grignard reagent or mixture thereof.

Useful silicone polymer components that can be used in the practice of the invention include silicone polymers that comprise an organosubstituted polysiloxane. Diorgano substituents include, for example, dimethyl, methylvinyl, methylphenyl, diphenyl, methylethyl, and (3,3,3-trifluoropropyl) methyl. In one embodiment, the diorgano substituents are dimethyl. The silicone polymer will typically be end-capped with functional groups such as hydroxyl, alkoxyl, hydride, vinyl functional groups, and like groups. In one embodiment, end-capped functional groups are hydroxyl groups. The molecular weight of polydiorganosiloxane will typically range from about 50,000 to about 1,000,000, preferably, from about 80,000 to about 300,000. Unless otherwise stated, molecular weight refers herein to the weight averaged molecular weight, Mw.

Useful silicone resin components that can be used in the practice of the invention include MQ silicone resins that contain 0.05 to 5 weight percent of silicon-bound hydroxyl groups and comprise triorganosiloxyl units of $R_3SiO_{1/2}$ and tetrafunctional siloxyl units of $SiO_{4/2}$ in a mole ratio of from 0.1-0.9, preferably 0.6-0.9 $R_3SiO_{1/2}$ units for each $SiO_{4/2}$. They can be used as a solid or in a solution of an organic solvent such as toluene or xylene. Preferred organic R groups of the silicone resin are vinyl, methyl, phenyl, and like groups, as well as mixtures thereof One preferred R group is a methyl group. The resins can be also further treated with, for example, $Me_3SiOSiMe_3$, $ViMe_2SiOSiMe_2Vi$, $MeViPhSiO$-$SiPhViMe$, $Me_3SiNHSiMe_3$ or triorganosilane such as $Me_3SiCl$, $Me_2ViSiCl$ or $MeViPhSiCl$ to reduce the amount of OH in the resin (where Me=methyl; Vi=vinyl and Ph=phenyl).

Useful acrylic polymer components that can be used in the practice of the invention include acrylic polymers that comprise at least an alkoxysilyl functional monomer, polysiloxane-containing monomer, halosilyl functional monomer or alkyoxy halosilyl functional monomer. The alkoxysilyl functional monomers, once incorporated onto the acrylic polymer backbone, undergo condensation reactions with OH functional groups of the silicone resin or silicone polymer in the presence of a catalyst. The alkoxysilyl functional groups of the acrylic polymer can also undergo a self-crosslinking reaction in the presence of water/moisture and the catalyst during the condensation reaction. This crosslinking reaction yields stable domains of crosslinked acrylic polymer contributing to cohesive strength in the final adhesive film. Such acrylic polymer domains also serve as many small reservoirs for dissolving and storing drug molecules. Polysiloxane chains undergo chain-cleavage and recombination with other components in the hybrid system through catalysis of acid or base. It has been discovered that polymers comprising greater than about 0.2 wt % of alkoxysilyl functional monomers are particularly well suited for use in hybrid adhesive compositions of the invention and can be used in the production of adhesive goods such as, for example, adhesive tapes and adhesive sheets by applying an adhesive or adhesive composition to a base material such as paper, cloth or plastic film.

Examples of alkoxysilyl functional monomers include trialkoxylsilyl and dialkoxylsilyl functional acrylates or methacrylates. Preferred alkoxysilyl functional monomers are trimethoxylsilyl and dimethoxymethylsilyl functional acrylates or methacrylates.

Examples of polysiloxane-containing monomers include polydimethylsiloxane monoacrylates or monomethacrylates.

Other useful silyl functional monomers include triethoxylsilyl and diethoxymethylsilyl functional acrylates or methacrylates.

The silyl functional monomers will typically be used in amounts of from 0.2 to 20 weight percent of the acrylic polymer, more preferably the amount of silyl functional monomers will range from about 1.5 to about 5 weight percent of the acrylic polymer.

The amount of polysiloxane-containing monomer will typically be used in amounts of from 1.5 to 50 weight percent of the acrylic polymer, more preferably the amount of polysiloxane-containing monomers will range from 5 to 15 weight percent of the acrylic polymer.

Another acrylic polymer component that can advantageously be used in the practice of the invention are acrylic polymers comprising end-capped alkoxysilyl functional groups or polysiloxane-blocked or -grafted copolymers. Examples of the end-capped alkoxysilyl functional groups are trialkoxylsilyl, dialkoxysilyl functional groups. Preferred end-capped alkoxysilyl functional groups are trimethoxylsilyl, dimethoxymethylsilyl, triethoxylsilyl and/or diethoxymethylsilyl functional groups. Examples of such polymers are SA polymers available from Kaneka. Block copolymers are also useful. An example of a polysiloxane block copolymer is polydimethylsiloxane-acrylic block copolymer. The preferred amount of siloxane block is 10 to 50 weight percent of the whole block polymer.

The acrylic polymer components comprise alkyl (meth) acrylate monomers. Preferred alkyl(meth)acrylates which may be used to practice the invention have up to about 18 carbon atoms in the alkyl group, preferably from 1 to about 12 carbon atoms in the alkyl group. These acrylic polymer components may comprise a low glass transition temperature (Tg) alkyl acrylate monomer. Low Tg monomers are those having a homopolymer Tg of less than about 0° C. Preferred low Tg alkyl acrylates for use in the invention have from about 4 to about 10 carbon atoms in the alkyl group and include butyl acrylate, amyl acrylate, hexyl acrylate, 2-ethylhexyl acrylate, octyl acrylate, isooctyl acrylate, decyl acrylate, isomers thereof, and combinations thereof. Particularly preferred are butyl acrylate, 2-ethylhexyl acrylate and isooctyl acrylate. The low Tg acrylic monomers are preferably, but not necessarily, present in amounts greater than about 40 wt % based upon the total monomer weight of the acrylic polymer. The acrylic polymer components may further comprise (meth) acrylate monomers having a high glass transition temperature. Non-limiting examples include methyl acrylate, ethyl acrylate, methyl methacrylate and isobutyl methacrylate. It will be understood by a skilled practitioner that the choice of monomers is dictated by consideration of adhesive properties, compatibility with the other adhesive matrix components, drug solubility and so forth. Thus the monomer Tg is only one of many variables to be taken into account in any particular polymer design.

The acrylic polymer component may further comprise a polyisobutylene group to improve cold flow properties of the resultant adhesive.

Exemplary acrylic polymers that contain halosilyl or alkoxy-halosilyl functional monomers can be obtained by copolymerizing 3-methacryloxypropyldimethylchlorosilane, 3-methacryloxypropyldichlorosilane, 3-methacryloxypropyltrichlorosilane, 3-acryloxypropyldimethylchlorosilane, 3-acryloxypropyldichlorosilane and 3-acryloxypropyltrichlorosilane.

The acrylic polymer components may comprise nitrogen-containing polar monomers. Examples include N-vinyl pyrrolidone, N-vinyl caprolactam, N-tertiary octyl acrylamide, dimethyl acrylamide, diacetone acrylamide, N-tertiary butyl acrylamide, N-isopropyl acrylamide, cyanoethylacrylate, N-vinyl acetamide and N-vinyl formamide.

The acrylic polymer component may comprise one or more hydroxyl containing monomers such as 2-hydroxyethyl acrylate, 2-hydroxyethyl methacrylate, hydroxypropyl acrylate and/or hydroxypropyl methacrylate. Such hydroxy functional monomers are generally used in amounts up to about 40 wt %, more typically from about 0.5 to about of 10 wt %, based on the total monomer weight of the acrylic polymer.

The acrylic polymer components may, if desired, comprise carboxylic acid containing monomers. Useful carboxylic acids preferably contain from about 3 to about 6 carbon atoms and include, among others, acrylic acid, methacrylic acid, itaconic acid, β-carboxyethyl acrylate and the like. Acrylic acid is particularly preferred. Such carboxy functional monomers are generally used in amounts up to about 25 wt %, more typically from about 0.5 to about of 10 wt %, based on the total monomer weight of the acrylic polymer.

Other useful, well known comonomers include vinyl acetate, styrene, cyclohexyl acrylate, alkyl di(meth)acrylates, glycidyl methacrylate and allyl glycidyl ether, as well as macromers such as, for example, poly(styryl)methacrylate.

One acrylic polymer component that can be used in the practice of the invention is an acrylic polymer that comprises from about 90 to about 99.5 wt % of butyl acrylate and from about 0.5 to about 10 wt % dimethoxymethylsilyl methacrylate.

While a particular polymerization method is described in the examples, the acrylic polymer component of the present invention may be prepared by conventional polymerization methods familiar to those of skill in the art. These methods include without limitation, solution polymerization, suspension polymerization, bulk polymerization and emulsion polymerization. In the practice of the invention, it may also be advantageous to reduce the residual monomer content, or remove or reduce solvent levels and/or other volatiles, following polymerization using methods which are known and conventional in the art. The adhesive may be applied from organic solution, aqueous dispersion, or from a melt.

The hybrid pressure sensitive adhesive compositions can be prepared using any suitable means, depending on the reactive groups present on the silicone polymer, silicone resin and acrylic polymers. The hybrid polymer may conveniently be prepared using a one step process. In one preferred method adhesives are prepared by condensation reaction of a mixture of the silicone polymer component, the silicone resin component and the acrylic component. The reaction can take place without catalyst or, alternatively and more preferably, in the presence of a catalyst.

Examples of the catalyst include organometallic salts of metals such as tin, titanium, aluminum, bismuth, organometallic reagents such as organolithium reagents and Grignard reagents, organic and inorganic acid, such as methanesulfonic acid, sulfuric acid, acidic clay, acidic Amberlyst™ ion exchange resins (Rohm and Haas), organic and inorganic bases such as KOH, NaOH, $(NH_4)_2CO_3$, ammonium carbamate, and organic bases such as triethylamine, triethanolamine. For reactive groups such as halosilanes in the acrylic polymer, the condensation reaction with the silicone polymer and/or silicone resin may not require the use of a catalyst. While the condensation reaction may take place at room temperature, one preferred method is to conduct the condensation reaction with heating at 50-160° C. Organic solvents such as toluene, heptane or xylene can be used as reaction solvent. Other organic solvents such as aliphatic hydrocarbons, tetrahydrofuran, ethyl acetate, methyl ethyl ketone, etc., may also be used as reaction solvent or co-solvent. Condensation is preferably allowed to proceed at least until the rate of evolution of condensation byproducts, such as water and alcohol are substantially removed. Heating is continued until the desired physical properties such as viscosity, tack and adhesion values are obtained. Typically the mixture will be allowed to react for a period of time of from about 1 to about 24 hours.

For compatibility with basic drugs it is often desirable to cap the remaining silicon-bound hydroxyl groups following the condensation reactions of the silicone polymer, MQ resin and acrylic polymer components. This is conveniently achieved by further heating the solution in the presence of, for example, hexamethyldisilazane. Other suitable chemical post-treatments are taught in U.S. Pat. No. 4,655,767 to Dow Corning Corp.; these are incorporated herein by reference. The end capping is step prevents the drug or actives from catalyzing further condensation of free hydroxyl groups leading to a loss of tack. The end capping is also essential for viscosity stability of the formulation if free hydroxyl groups are present. To achieve viscosity stability of PSA formulation, certain residual bases such as KOH, NaOH or organic amines may need to be scavenged to prevent further condensation of free hydroxyl groups. This may be achieved by neutralizing with carboxylic acids such as acetic acid or long chain fatty acids such as oleic acid, stearic acid, or polymer acids such as acidic amberlyst, etc. When long chain fatty acids are used, the resulting salt would remain as a surfactant in the mixture and may also serve as drug permeability enhancer.

When the condensation reaction is complete, the solids content of the resulting hybrid pressure-sensitive adhesive composition can be adjusted by adding or removing solvent. The solvent present can be completely removed and a different organic solvent added to the hybrid pressure-sensitive adhesive product. It is preferred to have the hybrid pressure-sensitive adhesive compositions in an organic solvent solution wherein the organic solvent comprises from about 30 to about 90 weight percent of the total mixture of components.

While it is an object of the invention to improve cohesion by providing self-crosslinking without the need for an external agent, it will be obvious to the skilled practitioner that the pressure-sensitive adhesives of this invention can be further crosslinked by peroxide through vinyl groups on component polymers. Similarly, additional post-polymerization crosslinking of the acrylic phase can be achieved, if desired, by addition of known crosslinkers such as organometallic compounds.

As used herein, the term "pressure-sensitive adhesive" refers to a viscoelastic material which adheres instantaneously to most substrates with the application of slight pressure and remains permanently tacky. A polymeric composition can be a pressure-sensitive adhesive within the meaning of the term as used herein if it has the properties of a pressure-sensitive adhesive per se or functions as a pressure-sensitive adhesive by admixture with tackifiers, plasticizers or other additives.

Suitable tackifying agents are those known in the art including: (1) aliphatic hydrocarbons; (2) mixed aliphatic and aromatic hydrocarbons; (3) aromatic hydrocarbons; (4) substituted aromatic hydrocarbons; (5) hydrogenated esters; (6) polyterpenes; (7) rosin esters; and (8) wood resins or rosins and hydrogenated forms thereof. Useful levels of tackifiers are generally from about 1 wt % to about 30 wt % based on the weight of the total adhesive composition.

Adhesives of the invention may also comprise blended polymers to further increase or decrease, as may be necessary, the solubility of the drug in an adhesive polymer matrix. Examples of polymers useful for blending with adhesive polymers of this invention include, but are not limited to, other acrylates, polysiloxanes, polyisobutylene, polypropylene oxide, polyisoprene, polybutadiene, styrenic block polymers, and the like. Examples of styrenic block copolymers include, but are not limited to, styrene-isoprene-styrene block copolymer (SIS), styrene-butadiene-styrene copolymer (SBS), styrene-ethylenebutene-styrene copolymers (SEBS), and diblock analogs thereof.

The compositions of the invention may include other additives known to those skilled in the art. These additives may include, but are not limited to, pigments, fillers, fluorescent additives, flow and leveling additives, wetting agents, surfactants, antifoaming agents, rheology modifiers, permeation enhancers, stabilizers, and antioxidants.

Antioxidants are typically added singly or in combination to protect the ingredients against degradation during preparation and use of the adhesive compositions and to ensure long-term thermal stability. In general up to about 1% by weight of one or more antioxidants may be included in the adhesive compositions, usually, from about 0.1% to about 0.5% by weight.

While the pressure sensitive adhesive of the invention may be used in any number of applications, e.g., labels, the adhesive is particularly well-suited for use in medical applications. The pressure sensitive adhesives find use in the manufacture of articles such as ostomy seals, adhesive tapes and bandages, wound drainage adhesive seals, wound dressings, as adherents for other products and the like that adhere to human skin and remain adherent even in a moist environment. The pressure sensitive adhesives of the invention may also be used in industrial tape and many other PSA applications.

The adhesive of the invention is particularly well-suited for use in transdermal drug delivery applications. The pressure sensitive adhesive of the invention may be incorporated into a transdermal drug delivery device designed to deliver a therapeutically effective amount of a product to the skin of a patient, e.g., to cure a skin irritation or to deliver a therapeutically effective amount of drug across the skin of a patient. The term transdermal refers to the use of the skin as a portal for the administration of drugs by topical application or for diagnostic procedures such as the monitoring of blood chemistry. The topically applied drug passes into and/or through the skin. Thus "transdermal" is herein used broadly to refer to the topical administration of a drug which acts locally, i.e., at the surface or within the skin, such as, for example, a blemish patch used to treat acne, and to the topical application of a drug which acts systemically by diffusing through the skin and entering the blood stream.

Transdermal drug delivery devices of the invention comprise a carrier (such as liquid, gel, or solid matrix, or a pressure sensitive adhesive) into which the drug to be delivered is incorporated, a distal backing layer and a proximal release layer. When the patient peels the release liner from the adhesive and applies the patch, the drug partitions into the stratum corneum (outer skin layer) and permeates through the epidermis and dermis.

The drug containing polymer layer is preferably a pressure-sensitive skin contact adhesive of the invention which is a pharmaceutically acceptable material that lacks functional groups containing, for example, reactive hydrogen moieties or other groups capable of undergoing reactions with the drug during patch manufacture or storage, or to change adhesive properties during storage as a result of unintended chemical reactions. The adhesive of the invention, whether used as a carrier contact adhesive or overlay contact adhesive for transdermal patches is non-irritating, easy to apply, and easy to remove.

The term "drug" is to be construed herein in its broadest sense to mean any agent which is intended to produce some therapeutic benefit. The agent may or may not be pharmaceutically active, but will be "bioactive" in the sense that it has an effect on the human body. The agent may be used to treat or alter a condition, which may or may not be a pathological, i.e., a disease state. "Drug", "bioactive agent," "preparation," "medicament," "therapeutic agent," "physiological agent" and "pharmaceutical agent" are used interchangeably herein and include substances for use in the diagnosis, cure, mitigation, arrest, treatment or prevention of a condition or disease state or to affect the structure or function of the body. Skin-wellness agents that function to e.g., soften and moisturize are included in this term. The term "treatment" is used broadly to encompass prevention, alteration, cure and control of the condition.

The drug is present in a drug delivery device of the invention in a therapeutically effective amount, i.e., an amount effective to bring about a desired therapeutic result in the treatment of a condition to which the preparation of this invention is to be applied. Effective amount of a drug means a nontoxic but sufficient amount of a drug to provide the selected effect over a specific period of time. The amount that constitutes a therapeutically effective amount varies according to the particular drug incorporated in the device, the condition being treated, any drugs being co-administered with the selected drug, desired duration of treatment, the surface area of the skin over which the device is to be placed, and other components of the drug delivery device. Such an amount is readily determinable by the skilled practitioner.

The drug delivery system of the invention, in addition to the drug, may advantageously also contain an effective amount of a penetration enhancer. An effective amount of a penetration enhancer means an amount that provides a selected increase in membrane permeability, rate of administration and amount of drug delivered. Suitable enhancers are described in, for example, "Percutaneous Penetration Enhancers" edited by E. H. Smith and H. I. Maibach, CRC Press, New York (1995).

The device of the invention is placed on the skin and allowed to remain for a time sufficient to achieve or maintain the intended therapeutic effect. The time that constitutes a sufficient time can be selected by those skilled in the art with consideration of the flux rate of the device of the invention and of the condition being treated.

The transdermal delivery devices of the invention can be made in the form of an article such as a tape, a patch, a sheet, a dressing or any other form known to those skilled in the art. The dosage system may be produced in any desirable unit form. A circular form is convenient as it contains no corners which might be easily detached from the skin whereas a square or rectangular shape serves to minimize waste when cut from a roll or sheet. In addition to having various shapes, the dosage units produced may come in various sizes.

Depending on the design of the patch and the condition to be treated (e.g., birth control, pain management, hypertension, smoking cessation, skin condition), the patch will remain on the skin for up to an hour or more, up to about one week. In a preferred embodiment, the patch is designed to remain on the skin at the application site for about 24 hours, and to be changed daily. In another preferred embodiment, the patch is replaced once or twice weekly. Preferably, the patch will be placed on the skin at a site different from the location of the previously used patches.

The term patient is used herein to include animals, both human and non-human, including companion animals such as dogs, cats and horses and livestock such as cattle and swine. Agricultural and horticultural applications are also contemplated.

Treatment areas where the delivery device of the invention finds use, and examples of pharmaceutical products which can be incorporated in the devices of the invention, include treatment for incontinence (e.g., oxybutinin), central nervous system conditions (e.g., methylphenidate, rotigotine), hormone therapy and birth control (e.g., estradiol, testosterone, progestin, progesterone, levonorgestrel) cardiovascular (e.g. nitroglycerin, clonidine) and cardiotonics (e.g., digitalis, digoxin), pain management or anti-inflammatory (e.g. fentanyl, sufentanyl, lidocaine, diclofenac, flurbiprofen), cosmetic (e.g., benzoyl peroxide, salicylic acid, vitamin C, vitamin E, aromatic oils), antinauseants (e.g., scopolamine, granisetron), smoking cessation (e.g. nicotine), antiinflammatory conditions, both steroidal (e.g., hydrocortisone, prednisolone, triamcinolone) and nonsteroidal (e.g., naproxen, piroxicam) treatments, antibacterials (e.g., penicillins such as penicillin V, cephalosporins such as cephalexin, erythromycin, tetracycline, gentamycin, sulfathiazole, nitrofurantoin, and quinolones such as norfloxacin, flumequine, and ibafloxacin), antiprotazoals (e.g., metronidazole), antifungals (e.g. nystatin), calcium channel blockers (e.g. nifedipine, diltiazem), bronchodilators (e.g., theophylline, pirbuterol, salmeterol, isoproterenol), enzyme inhibitors such as collagenase inhibitors, protease inhibitors, elastase inhibitors, lipoxygenase inhibitors, and angiotensin converting enzyme inhibitors (e.g., captopril, lisinopril), other antihypertensives (e.g., propranolol), leukotriene antagonists, anti-ulceratives such as H2 antagonists, antivirals and/or immunomodulators (e.g., 1-isobutyl-1H-imidazo[4,5-c]quinolin-4-amine, 1-(2-hydroxy-2-methyl-propyl)-1H-imidazo[4,5-c]quinoline-4-amine, and acyclovir), local anesthetics (e.g., benzocaine, propofol), antitussives (e.g., codeine, dextromethorphan), antihistamines (e.g., diphenhydramine, chlorpheniramine, terfenadine), narcotic analgesics (e.g., morphine, fentanyl, sufentanyl), cardioactive products such as atriopeptides, anticonvulsants (e.g., carbamazine), immunosuppressives (e.g., cyclosporine), psychotherapeutics (e.g., diazepam), sedatives (e.g., phenobarbital), anticoagulants (e.g., heparin), analgesics (e.g., acetaminophen), antimigraine agents (e.g., ergotamine, melatonin, sumatriptan), antiarrhythmic agents (e.g., flecainide), antiemetics (e.g., metaclopromide, ondansetron), anticancer agents (e.g., methotrexate), neurologic agents such as anxiolytic drugs, hemostatics, anti-obesity agents, and the like, as well as pharmaceutically acceptable salts, esters, solvates and clathrates thereof.

Veterinary drugs may also be conveniently applied using the transdermal drug delivery device of the invention, as well as agricultural and horticultural agents. It will be appreciated that transdermal drug delivery in veterinary and horticultural applications enables more exact dosing, and less waste than administration in the food/irrigation water.

A drug delivery device of the invention can be prepared by using conventional methods to apply an appropriate carrier to the backing. For example, a matrix device can be manufactured by preparing a coating formulation by mixing a solution of the adhesive in a solvent with the drug and any excipients to form a homogeneous solution or suspension; applying the formulation to a substrate (a backing or a release liner) using well known roll, knife, bar or extrusion die coating methods; drying the coated substrate to remove the solvent; and laminating the exposed surface to a release liner or backing.

The invention will be described further in the following examples that are included for purposes of illustration, and are not intended, in any way, to be limiting of the scope of the invention.

EXAMPLES

The silicone polymers (130,000-160,000) and methyl MQ resin (M/Q ratio was about 0.8) used in Examples 2 to 6 were made according to procedures in the prior art (*Silicon in Organic, Organometallic and Polymer Chemistry* by M. Brook, U.S. Pat. No. 2,676,182, U.S. Pat. No. 2,814,601). The silicone polymer and methyl MQ resin used in Examples 10-12 were obtained from commercial sources.

Example 1

An initial charge containing 90.0 g butyl acrylate, 7.0 g methyl methacrylate, 3.0 g of trimethoxysilylpropylacrylate, 0.17 g 2,2'-azobisisobutyronitrile (AIBN) (polymerization initiator), and 100.0 g ethyl acetate (solvent) was mixed and charged to a 1-L 4-neck round bottom flask equipped with stainless steel stirrer, thermometer, condenser, water bath, and slow addition funnels. The initial charge was heated to reflux while stirring. At 15 minutes from the start of reflux, monomer mix containing 270 g butyl acrylate, 21.0 g methyl methacrylate, 9.0 g of trimethoxysilylpropylacrylate were uniformly added over a period of 2 hours. Also at 15 minutes from the start of reflux, 51.15 g ethyl acetate and 1.20 g AIBN were simultaneously and uniformly added over a period of 4 hours. At the end of the addition, the flask contents were held at reflux for 1 hour. At the end of the hold period, the contents were cooled to room temperature and the polymer solution discharged. The ethyl acetate solvent was removed by rotary evaporation under vacuum and fresh xylene was added, adjusting the solids content to 50%.

Example 2

A mixture of silicone polymer polydimethylsiloxane (Mw 130,000, 48% in toluene, 90 g), acrylic polymer SA-100S from Kaneka (50% in toluene, 40 g) and base catalyst $(NH_4)_2CO_3$ (1.0 g) was stirred at 60° C. for 2 hr. Methyl MQ resin (32.0% in toluene, 135 g) was added and the reaction mixture stirred at 60° C. for 12 hr. The reaction mixture was then heated to 115° C. for 2 hr under a slow flow of nitrogen gas. Hexamethyldisilazane (5.0 g) was added and the reaction continued at 115° C. for 2 hr. The product was cooled to room temperature and packed in a glass jar for testing.

Example 3

A mixture of silicone polymer polydimethylsiloxane (Mw 160,000, 48% in xylene, 100.0 g), acrylic polymer prepared according to Example 1 (Mw 230,000, 50.0% in xylene, 43.0 g), methyl MQ resin (55.3% in xylene, 50 g) and acetic acid (0.5 g) was stirred at 50° C. for 3 hr and 135° C. for 3 hr. The product was cooled to room temperature and packed in a glass jar.

Example 4

A mixture of silicone polymer polydimethylsiloxane (Mw 160,000, 48% in xylene, 100.0 g), acrylic polymer prepared according to Example 1 (Mw 230,000, 50.0% in xylene, 43.0 g), methyl MQ resin (55.3% in xylene, 50 g) and base catalyst $(NH_4)_2CO_3$ (1.0 g) was stirred at 60° C. for 6 hr and 115° C. for 2 hr. Hexamethyldisilazane (5.0 g) was added and the reaction continued at 115° C. for 2 hr. The product was cooled to room temperature and packed in a glass jar for testing.

Example 5

A mixture of silicone polymer polydimethylsiloxane (Mw 160,000, 48% in xylene, 100.0 g), acrylic polymer prepared according to Example 1 (Mw 230,000, 50.0% in xylene, 43.0 g), methyl MQ resin (55.3% in xylene, 50 g) and KOH powder (0.05 g) was stirred at room temperature for 6 hr and 140° C. for 2 hr. Hexamethyldisilazane (5.0 g) was added and the reaction continued at 140° C. for 2 hr. The product was cooled to room temperature and packed in a glass jar for testing. After the reaction mixture was cooled to room temperature, acidic Amberlyst ion exchange resin (5 g) was added to neutralize the KOH. The product was filtered to remove any solid particles and packed in a glass jar.

Example 6

A mixture of silicone polymer polydimethylsiloxane (Mw 160,000, 48% in xylene, 100.0 g), acrylic polymer prepared according to Example 1 (Mw 230,000, 50.0% in xylene, 43.0 g), methyl MQ resin (55.3% in xylene, 50 g) and Amberlyst ion exchange resin (1.0 g) was stirred at 80° C. for 6 hr. The product was filtered to remove any solid particles and packed in a glass jar.

Example 7 (Comparative Example)

An initial charge containing 100.0 g butyl acrylate, 0.5 g 2,2'-azobisisobutyronitrile (AIBN), and 100.0 g ethyl acetate was prepared and charged to a 1-L 4-neck round bottom flask equipped with stainless steel stirrer, thermometer, condenser, water bath, and slow addition funnels. The mixture was heated to reflux while stirring. At 30 minutes from the start of reflux, 30 g ethyl acetate and 0.5 g AIBN were added over a period of 2 hours. At the end of the addition, the flask contents were held at reflux for 1 hour. At the end of the hold period, the ethyl acetate solvent was removed by rotary evaporation under vacuum and fresh toluene was added, adjusting the solids content to 50%.

Example 8

An initial charge containing 98.0 g butyl acrylate, 2.0 g of (3-acryloxypropyl) methyldimethoxy silane, 0.5 g 2,2'-azobisisobutyronitrile (AIBN), and 100.0 g ethyl acetate was prepared and charged to a 1-L 4-neck round bottom flask equipped with stainless steel stirrer, thermometer, condenser, water bath, and slow addition funnels. The mixture was heated to reflux while stirring. At 30 minutes from the start of reflux, 30 g ethyl acetate and 0.5 g AIBN were added over a period of 2 hours. At the end of the addition, the flask contents were held at reflux for 1 hour. At the end of the hold period, the ethyl acetate solvent was removed by rotary evaporation under vacuum and fresh toluene was added, adjusting the solids content to 50%.

Example 9

An initial charge containing 90.0 g butyl acrylate, 7.0 g of monomethacryloxypropyl-terminated polydimethylsiloxane (MCR-M17, Gelest), 3.0 g of (3-acryloxypropyl) methyldimethoxy silane, 0.4 g 2,2'-azobisisobutyronitrile (AIBN), and 100.0 g ethyl acetate was prepared and charged to a 1-L 4-neck round bottom flask equipped with stainless steel stirrer, thermometer, condenser, water bath, and slow addition funnels. The mixture was heated to reflux while stirring. At 30 minutes from the start of reflux, 30 g ethyl acetate and 0.4 g AIBN were added over a period of 2 hours. At the end of the addition, the flask contents were held at reflux for 1 hour. At the end of the hold period, the ethyl acetate solvent was removed by rotary evaporation under vacuum and fresh toluene was added, adjusting the solids content to 50%.

Example 10 (Comparative Example)

A mixture of silicone polymer polydimethylsiloxane (18.7 g), methyl MQ resin (17.0 g), $(NH_4)_2CO_3$ (0.5 g), and xylene (100 mL) was stirred at 60° C. for 2 hr, and then 115° C. for 2 hr. Hexamethyldisilazane (5.0 g) was added and the reaction continued at 115° C. for 2 hr. Acrylic polymer prepared according to Example 7 (50.0% in xylene, 18.0 g), was added and mixed well. The product was cooled to room temperature and packed in a glass jar for testing.

Example 11

A mixture of silicone polymer polydimethylsiloxane (18.7 g), methyl MQ resin (17.0 g), $(NH_4)_2CO_3$ (0.5 g), acrylic polymer prepared according to Example 8 (50.0% in xylene, 18.0 g), and xylene (100 mL) was stirred at 60° C. for 2 hr, and then 115° C. for 2 hr. Hexamethyldisilazane (5.0 g) was added and the reaction continued at 115° C. for 2 hr. The product was cooled to room temperature and packed in a glass jar for testing. The product was cooled to room temperature and packed in a glass jar for testing.

Example 12

A mixture of silicone polymer polydimethylsiloxane (18.7 g), methyl MQ resin (17.0 g), KOH powder (0.03 g), acrylic polymer prepared according to Example 8 (50.0% in xylene, 18.0 g), and xylene (100 mL) was stirred at 140° C. for 2 hr. Hexamethyldisilazane (5.0 g) was added and the reaction continued at 115° C. for 2 hr. The product was cooled to room temperature and packed in a glass jar for testing. The product was filtered, cooled to room temperature and packed in a glass jar for testing.

Example 13

A mixture of silicone polymer polydimethylsiloxane (3.9 g), methyl MQ resin (3.9 g), $(NH_4)_2CO_3$ (0.2 g), acrylic polymer prepared according to Example 9 (1.95 g), and toluene (20 mL) was stirred at 60° C. for 12 hr and 115° C. for 2 hr. Hexamethyldisilazane (0.7 g) was added and the reaction continued at 115° C. for 2 hr. The product was cooled to room temperature and packed in a glass jar for testing. The product was filtered, cooled to room temperature and packed in a glass jar for testing.

Example 14

A monomer mix of butyl acrylate (BA) (BASF) 196.0 g., and 3-acryloxypropylmethyldimethoxysilane (3-APMDS) (Gelest Inc.) 4.0 g. was prepared in heptanes and transferred to an addition funnel. Initiator solution of lauroyl peroxide (Sigma-Aldrich) 1.0 g. in heptane 80.0 g. was prepared and transferred to an addition funnel. Initial charge consisting of 20% of monomer mix, heptanes 160.0 g., and lauroyl peroxide 0.2 g. was weighed in a liter round bottom four neck flask equipped with a stainless steel stirrer with banana shaped blade, thermometer, condenser, oil bath, and addition funnels. Initial charge was heated to reflux while stirring. After 5 minutes of hold at reflux, monomer mix and initiator solution were slowly added continuously over 2 and 3 hours respectively while maintaining reflux. After the addition was complete, the flask content was stirred for 2 hours at reflux. A scavenger solution was prepared by mixing t-amylperoxy pivalate (t-APP 75%) (Akzo Nobel) 2.0 g. in heptanes 22.0 g. and added slowly over 1 hour at reflux. After the addition, the mixture was stirred for 2 hours. At the end of 2 hours hold, the flask content was cooled down to room temperature and analyzed for solids.

Example 15

A monomer mix of butyl acrylate (BA) (BASF) 196.0 g., and Methacryloxymethyltrimethoxysilane (Gelest Inc.) 4.0 g. was prepared in heptane and transferred to an addition funnel. Initiator solution of lauroyl peroxide (Sigma-Aldrich) 1.0 g. in heptanes 80.0 g. was prepared and transferred to an addition funnel. Initial charge consisting of 20% of monomer mix, heptanes 160.0 g., and lauroyl peroxide 0.2 g. was weighed in a liter round bottom four neck flask equipped with a stainless steel stirrer with banana shaped blade, thermometer, condenser, oil bath, and addition funnels. Initial charge was heated to reflux while stirring. After 5 minutes of hold at reflux, monomer mix and initiator solution were slowly added continuously over 2 and 3 hours respectively while maintaining reflux. After the addition was complete, the flask content was stirred for 2 hours at reflux. A scavenger solution was prepared by mixing t-amylperoxy pivalate (t-APP 75%) (Gelest Inc.) 2.0 g. in heptanes 22.0 g. and added slowly over 1 hour at reflux. After the addition, the mixture was stirred for 2 hours. At the end of 2 hours hold, the flask content was cooled down to room temperature and analyzed for solids.

Example 16

Silicone polymer polydimethylsiloxane 18.0 g (Mw 130,000), methyl silicone resin (MQ) 18.0 g., and heptane 77.8 g. were weighed in a 250 mL round bottom four neck flask equipped with a stainless stirrer with banana shaped blade, thermometer, condenser, oil bath, and addition funnel. The mixture was stirred at room temperature. Base catalyst 1N KOH 0.12 g. was added to the flask and the mixture was heated to reflux while stirring for 5-6 hours. Next day acrylic polymer (Example 14) 9.0 g. was added to the mixture while stirring and heated to reflux for 5-6 hours. Hexamethyldisilazane (Dow Corning) 3.05 g. was added and stirred for additional 2 hours. The solution was cooled to room temperature and analyzed for solids, and viscosity.

Example 17

Silicone polymer polydimethylsiloxane 18.0 g (Mw 130,000), methyl silicone resin (MQ) 18.0 g., and heptane 77.8 g. were weighed in a 250 mL round bottom four neck flask equipped with a stainless stirrer with banana shaped blade, thermometer, condenser, oil bath, and addition funnel. The mixture was stirred at room temperature. Base catalyst 1N KOH 0.12 g. was added to the flask and the mixture was heated to reflux while stirring for 5-6 hours. Next day acrylic polymer (Example 14) 9.0 g. was added to the mixture while stirring and heated to reflux for 5-6 hours. Oleic acid (Sigma-Aldrich) 2.44 g. was added to the mixture while stirring and heated to reflux for 2 hours. Hexamethyldisilazane (Dow Corning) 3.05 g. was added and stirred for additional 2 hours. The solution was cooled to room temperature and analyzed for solids, and viscosity.

Example 18

Silicone polymer polydimethylsiloxane 18.0 g (Mw 130,000), methyl silicone resin (MQ) 18.0 g., heptane 77.8 g. were weighed in a 250 mL round bottom four neck flask equipped with a stainless stirrer with banana shaped blade, thermometer, condenser, oil bath, and addition funnel. The mixture was stirred at room temperature. Base catalyst 1N KOH 0.12 g. was added to the flask and the mixture was heated to reflux while stirring for 5-6 hours. Next day acrylic polymer (Example 15) 9.0 g. was added to the mixture while stirring and heated to reflux for 5-6 hours. Hexamethyldisilazane (Dow Corning) 3.05 g. was added and stirred for additional 2 hours. The solution was cooled to room temperature and analyzed for solids, and viscosity.

Example 19

Methyl silicone resin (MQ) 18.0 g., acrylic polymer (of Example 14) 9.0 g. and heptane 77.8 g. were weighed in a 250 mL round bottom four neck flask equipped with a stainless stirrer with banana shaped blade, thermometer, condenser, oil bath, and addition funnel. The mixture was stirred at room temperature. Base catalyst 1N KOH 0.12 g. was added to the flask and the mixture was heated to reflux while stirring for 5-6 hours. Next day silicone polymer polydimethylsiloxane 18.0 g (Mw 130,000) was added to the mixture while stirring and heated to reflux for 5-6 hours. Hexamethyldisilazane (Dow Corning) 3.05 g. was added and stirred for additional 2 hours. The solution was cooled to room temperature and analyzed for solids, and viscosity. The final product was a stable solution.

Example 20

Silicone polymer polydimethylsiloxane 18.0 g (Mw 130,000), acrylic polymer (of Example 14) 9.0 g. and heptane 77.8 g. were weighed in a 250 mL round bottom four neck flask equipped with a stainless stirrer with banana shaped blade, thermometer, condenser, oil bath, and addition funnel. The mixture was stirred at room temperature. Base catalyst 1N KOH 0.12 g. was added to the flask and the mixture was heated to reflux while stirring for 5-6 hours. Next day methyl silicone resin (MQ) 18.0 g. was added to the mixture while stirring and heated to reflux for 5-6 hours. Hexamethyldisilazane (Dow Corning) 3.05 g. was added and stirred for additional 2 hours. The solution was cooled to room temperature and analyzed for solids, and viscosity.

Example 21

The silicone-acrylic hybrid polymers prepared according to Examples 2-6, 12, 16, 17 and 21 were evaluated for their adhesive performance on stainless steel (SS) and low density polyethylene (LDPE) panels according to Pressure Sensitive Tape Council test methods PSTC-16 for peel resistance, PSTC-101 for loop tack and PSTC-107 for shear resistance at 22° C. and 50% relative humidity. Table 1 summarizes the test results of various silicone-acrylic hybrid adhesives, compared with two pure silicone pressure sensitive adhesives available from Dow Corning under the trade name BIO-PSA® products 7-4202 and 7-4302.

TABLE 1

| | Samples | | | | | | | | | | |
|---|---|---|---|---|---|---|---|---|---|---|---|
| | 2 | 3 | 4 | 5 | 6 | 12 | 16 | 17 | 21 | 7-4202 | 7-4302 |
| SS 180° Peel (oz/in) | | | | | | | | | | | |
| 20 min | 16.91 | 7.58 | 2.38 | 11.24 | 17.24 | 33.75 | 34.21 | 23.09 | 11.24 | 12.53 | 7.73 |
| 24 hrs | 14.86 | 19.11 | 2.25 | 6.50 | 17.77 | 32.47 | 38.95 | 19.88 | 6.50 | 13.75 | 6.29 |
| 1 week | 18.21 | 14.43 | 2.49 | 3.33 | 17.90 | 37.00 | 39.96 | 27.1 | 3.33 | 14.45 | 8.46 |
| LDPE 180° Peel (oz/in) | | | | | | | | | | | |
| 20 min | 14.54 | 8.97 | 1.33 | 13.53 | 16.17 | 26.80 | 9.04 | 7.91 | 13.53 | 13.79 | 7.40 |
| 24 hrs | 15.90 | 14.32 | 2.60 | 7.88 | 17.75 | 32.47 | 30.84 | 24.31 | 7.88 | 12.75 | 10.92 |
| 1 week | 18.41 | 17.80 | 1.47 | 12.53 | 18.17 | 30.57 | 28.66 | 25.71 | 12.53 | 15.19 | 9.29 |
| Loop Tack (oz/in) | 15.46 | 4.19 | 12.93 | 10.62 | 19.95 | 35.26 | 19.04 | 16.58 | 10.62 | 0.77 | 4.67 |
| Shear (4.4 psi, h) | 2.74 | >168 | 0.28 | >168 | 9.53 | >168 | >168 | >168 | >168 | 34.45 | 1.17 |

The probe tack of these silicone and silicone-acrylic hybrid adhesives were also measured using a TA Instruments Texture Analyzer® with either no hold time or a 10 second hold. Results are shown in Table 2.

TABLE 2

| | Samples | | | | | | |
|---|---|---|---|---|---|---|---|
| | 2 | 3 | 4 | 5 | 6 | 7-4202 | 7-4302 |
| Peak Force (g), No hold | 18.78 | 78.45 | 121.79 | 21.01 | 51.10 | 53.14 | 34.34 |
| Peak Force (g), 10 second hold | 28.68 | 169.74 | 167.49 | 30.17 | 89.89 | 60.96 | 46.08 |

The data in Tables 1 and 2 show that the invention provides adhesives with a wide range of pressure sensitive properties. One preferred composition, Example 12, shows very high levels of peel, tack, and shear, and is superior to the commercial pure silicone PSAs shown by way of comparison.

Example 22

The silicone-acrylic blend adhesive of comparative Example 10 and the silicone-acrylic hybrid adhesives (Examples 11 and 12) were analyzed for performance. Table 3 shows peel, tack and shear data for the Examples 10, 11 and 12 compositions, determined as described above. Dynamic mechanic analysis (DMA) of comparative Example 10 and Examples 11 and 12 exhibited distinct mechanical behaviors, as shown in FIG. 1. The most notable difference between a silicone-acrylic non-reacted blend and a silicone-acrylic reacted hybrid is seen in the storage modulus curves. The storage modulus of the silicone-acrylic blend (Example 10) decreases as temperature increases and there is no modulus plateau. However, the storage moduli of the silicone-acrylic hybrids (Examples 11 and 12) show a plateau after passing through a glass transition region as the temperature increases. The modulus plateau from the silicone-acrylic hybrid polymers clearly indicates that the silane functionality on the acrylic polymer has reacted with the silicone polymer and/or MQ resin to increase the overall cross-link density.

The DMA data in FIG. 1 also shows that a stronger base (KOH, Example 12) provides higher levels of reaction between the three components versus the weaker base (ammonium carbonate, Example 11), as evidenced by the much higher plateau modulus value for Example 12 versus Example 11. The enhanced reaction from the stronger base also leads to superior peel, tack, and shear properties (compare the data in Table 3 for Examples 11 and 12).

TABLE 3

| Samples | 10 | 11 | 12 |
|---|---|---|---|
| SS 180° Peel (oz/in) | | | |
| 20 min | 12.24 | 10.82 | 33.75 |
| 24 hrs | 13.52 | 12.21 | 32.47 |
| 1 week | 14.92 | 13.49 | 37.00 |
| LDPE 180° Peel (oz/in) | | | |
| 20 min | 12.74 | 10.57 | 26.80 |
| 24 hrs | 12.12 | 9.54 | 32.47 |
| 1 week | 14.41 | 12.44 | 30.57 |
| Loop Tack (oz/in) | 17.09 | 25.57 | 35.26 |
| Shear (h), ½" × 1" × 1000 g/RT (4.4 psi) | 1.12 | 0.19 | >168 |

Figure 2:
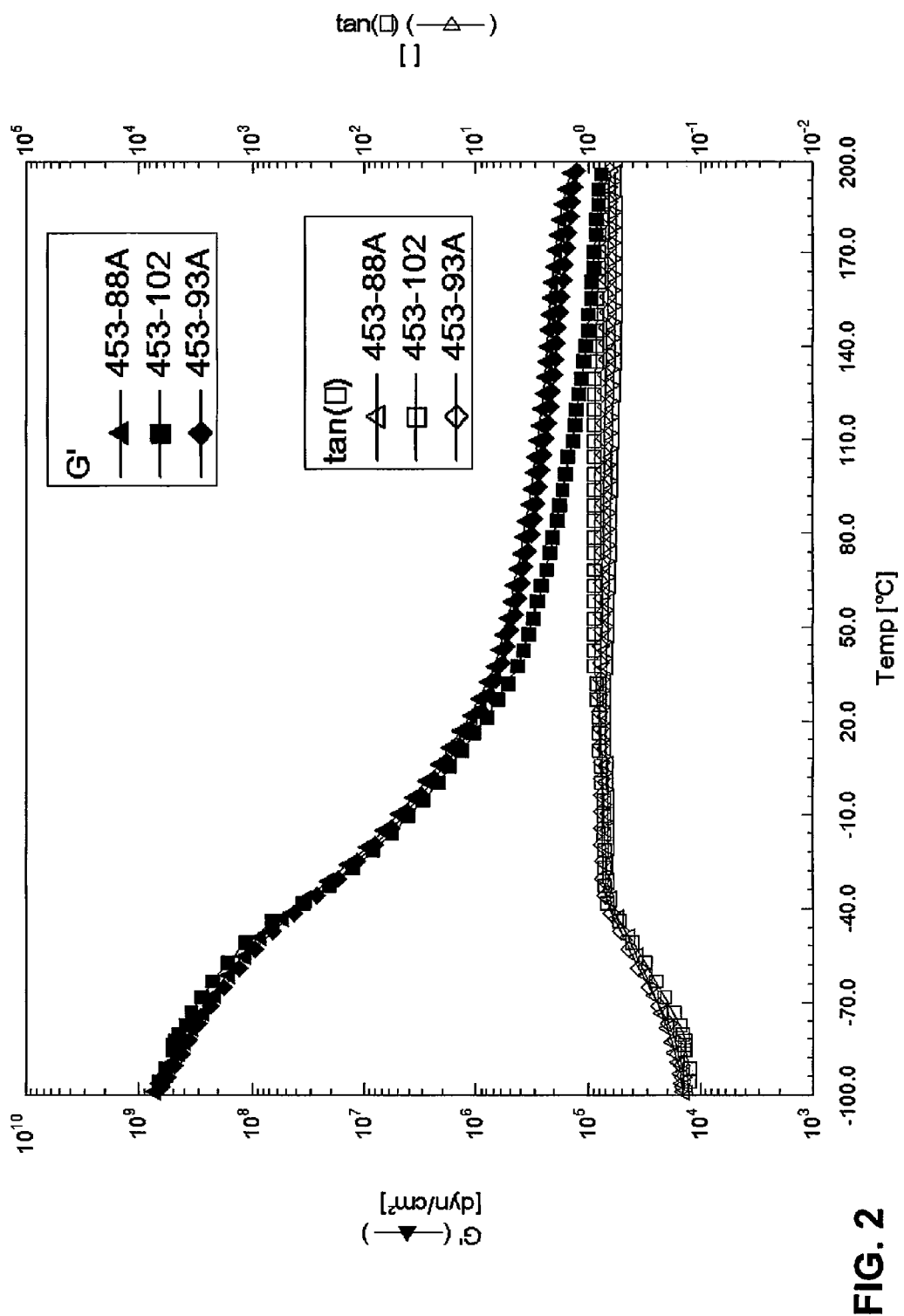
FIG. 2 is a DMA graph showing the mechanical behavior of hybrid silicone acrylic polymer which has been reacted in a sequential reaction process.

As shown in FIG. 2, Example 16 exhibited distinct mechanical behaviors. The storage moduli of the silicone-acrylic hybrid made by sequentially adding each component showed a plateau after passing through a glass transition region as the temperature increased. This plateau indicated that the silane functionality on the acrylic polymer has reacted with the silicone polymer and/or MQ resin to increase the overall cross-link density.

Several silicone-acrylic hybrid polymers, made according to Examples 16 were tested for phase separation. Samples were left in a test tube and the number of days it took to separate into two distinct layer are recorded in Table 4. The data in Table 4 shows that hybrid polymer prepared in sequential manner, consistently, did not show visible phase separation for greater than 30 of days.

TABLE 4

| Sample Number | 16 |
|---|---|
| Visible phase separation (in days) | >30, >30, >30, >30, >30 |

The phase stability of Example 16 sample was also tested using a Beckman Coulter Allegra X-12 Centrifuge. About eight ounce of Example 16 hybrid polymer put in a jar and the jar was loaded in a cup holder. The Example 16 sample was then spun at 2000 RPM for 30 minutes. There was no phase separation even after centrifuging and the sample remained homogenous (did not phase separate) for more than one month.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. A hybrid silicone acrylate polymer prepared by chemically reacting together:
   (a) a silicone polymer component;
   (b) a silicone resin component; and
   (c) an acrylic polymer component prepared from acrylic monomers containing functional groups selected from alkoxysilyl, polysiloxane, halosilyl or alkyoxy halosilyl, in which the functional groups are incorporated and covalently bound onto the backbone of the acrylic polymer;
   wherein the acrylic polymer component of the hybrid silicone acrylate polymer is covalently self-crosslinked and covalently bound to the silicone polymer component and/or the silicone resin component of the hybrid silicone acrylate polymer.

2. The hybrid silicone acrylate polymer of claim 1 wherein the silicone polymer comprises an organodisubstituted polysiloxane.

3. The hybrid silicone acrylate polymer of claim 1 wherein the silicone resin component comprises a silicone resin containing triorganosiloxy units $R_3SiO_{1/2}$, where R is an organic group, and tetrafunctional siloxyl units $SiO_{4/2}$ in a mole ratio of from 0.6 to 0.9 $R_3SiO_{1/2}$ units for each $SiO_{4/2}$.

4. The hybrid silicone acrylate polymer of claim 1 wherein the acrylic polymer is prepared from monomers selected from the group consisting of butyl acrylate, 2-ethylhexyl acrylate, isooctyl acrylate, methyl acrylate, methyl methacrylate, t-octyl acrylamide, hydroxyethyl acrylate, acrylic acid, hydroxypropyl acrylate, hydroxylpropyl methacrylate and mixtures thereof.

5. A pressure sensitive adhesive comprising the hybrid silicone acrylate polymer of claim 1.

6. A solution of a pressure sensitive adhesive composition comprising the hybrid silicone acrylate polymer of claim 1.

7. A hybrid silicone acrylate polymer prepared by chemically reacting together
   (a) a silicone polymer component;
   (b) a silicone resin component; and
   (c) an acrylic polymer component prepared from acrylic monomers containing functional groups selected from alkoxysilyl, polysiloxane, halosilyl or alkyoxy halosilyl, in which the functional groups are incorporated and covalently bound onto the backbone of the acrylic polymer;
   wherein the silicone resin component comprises a silicone resin containing triorganosiloxy units $R_3SiO_{1/2}$, where R is an organic group, and tetrafunctional siloxyl units $SiO_{4/2}$ in a mole ratio of from 0.1 to 0.9 $R_3SiO_{1/2}$ units for each $SiO_{4/2}$.

8. The hybrid silicone acrylate polymer of claim 7 wherein the silicone polymer comprises an organodisubstituted polysiloxane.

9. The hybrid silicone acrylate polymer of claim 7 wherein the silicone resin component comprises a silicone resin containing triorganosiloxy units $R_3SiO_{1/2}$, where R is an organic group, and tetrafunctional siloxyl units $SiO_{4/2}$ in a mole ratio of from 0.6 to 0.9 $R_3SiO_{1/2}$ units for each $SiO_{4/2}$.

10. The hybrid silicone acrylate polymer of claim 7 wherein the acrylic polymer is prepared from monomers selected from the group consisting of butyl acrylate, 2-ethylhexyl acrylate, isooctyl acrylate, methyl acrylate, methyl methacrylate, t-octyl acrylamide, hydroxyethyl acrylate, acrylic acid, hydroxypropyl acrylate, hydroxylpropyl methacrylate and mixtures thereof.

11. A pressure sensitive adhesive comprising the hybrid silicone acrylate polymer of claim 7.

12. A solution of a pressure sensitive adhesive composition comprising the hybrid silicone acrylate polymer of claim 7.

13. A method of preparing a hybrid silicone acrylic polymer of claim 1 comprising:
    a) reacting silicone polymer component with silicone resin component to form a resultant product
    b) reacting the resultant product of a) with an acrylic polymer
    wherein the components are reacted in an organic solvent.

14. A method of preparing a hybrid silicone acrylic polymer of claim 1 comprising:
    a) reacting a silicone resin component with an acrylic polymer to form a resultant product
    b) reacting the resultant product of a) with silicone polymer component
    wherein the components are reacted in an organic solvent.

15. A method of preparing a hybrid silicone acrylic polymer of claim 1 comprising:
    a) reacting a silicone polymer component with an acrylic polymer to form a resultant product
    b) reacting the resultant product of a) with a silicone resin component
    wherein the components are reacted in an organic solvent.

16. A method of preparing a hybrid silicone acrylic polymer of claim 7 comprising:
    a) reacting silicone polymer component with silicone resin component to form a resultant product
    b) reacting the resultant product of a) with an acrylic polymer
    wherein the components are reacted in an organic solvent.

17. A method of preparing a hybrid silicone acrylic polymer of claim 7 comprising:
    a) reacting a silicone resin component with an acrylic polymer to form a resultant product
    b) reacting the resultant product of a) with silicone polymer component
    wherein the components are reacted in an organic solvent.

18. A method of preparing a hybrid silicone acrylic polymer of claim 7 comprising:
    a) reacting a silicone polymer component with an acrylic polymer to form a resultant product
    b) reacting the resultant product of a) with a silicone resin component
    wherein the components are reacted in an organic solvent.

* * * * *